(12) United States Patent
He et al.

(10) Patent No.: US 12,743,820 B2
(45) Date of Patent: Sep. 22, 2026

(54) VIRTUAL MASK WEARING METHOD AND APPARATUS. TERMINAL DEVICE, AND READABLE STORAGE MEDIUM

(71) Applicant: BMC MEDICAL CO., LTD., Beijing (CN)

(72) Inventors: Long He, Beijing (CN); Mingzhao Zhou, Beijing (CN); Zhi Zhuang, Beijing (CN)

(73) Assignee: BMC MEDICAL CO., LTD., Beijing (CN)

( * ) Notice: Subject to any disclaimer, the term of this patent is extended or adjusted under 35 U.S.C. 154(b) by 171 days.

(21) Appl. No.: 18/723,814

(22) PCT Filed: Dec. 8, 2022

(86) PCT No.: PCT/CN2022/137573
§ 371 (c)(1),
(2) Date: Jun. 24, 2024

(87) PCT Pub. No.: WO2023/124878
PCT Pub. Date: Jul. 6, 2023

(65) Prior Publication Data

US 2025/0061613 A1 Feb. 20, 2025

(30) Foreign Application Priority Data

Dec. 31, 2021 (CN) ......................... 202111678051.6

(51) Int. Cl.
*G06T 11/00* (2026.01)
*G06V 40/16* (2022.01)

(52) U.S. Cl.
CPC ............ *G06T 11/00* (2013.01); *G06V 40/165* (2022.01); *G06V 40/168* (2022.01)

(58) Field of Classification Search
None
See application file for complete search history.

(56) References Cited

U.S. PATENT DOCUMENTS

2014/0278319 A1 9/2014 Thiruvengada et al.
2015/0293382 A1 10/2015 Jethmalani et al.
(Continued)

FOREIGN PATENT DOCUMENTS

CN 106845379 6/2017
CN 106999742 8/2017
(Continued)

OTHER PUBLICATIONS

JPO, Office Action for JP Application No. 2024-536987, Apr. 1, 2025.

(Continued)

*Primary Examiner* — Nicholas R Wilson
(74) *Attorney, Agent, or Firm* — Hodgson Russ LLP

(57) ABSTRACT

A virtual wearing method for a mask includes: acquiring a facial image of a user; determining actual facial feature data according to the facial image; determining and displaying one or more matched first masks of various models according to the actual facial feature data; determining a target mask from the first masks according to received first input from the user; and generating wearing picture information according to the facial image and the target mask, and displaying the wearing picture information. It can not only accurately match a plurality of first masks of different types and sizes suitable for the facial features of the user according to the facial feature data of the user, but also generate and display the wearing picture information through virtual reality and other technologies, so as to simulate the effect of the user wearing the target mask.

20 Claims, 4 Drawing Sheets

(56) References Cited

U.S. PATENT DOCUMENTS

| | | | | |
|---|---|---|---|---|
| 2016/0180587 | A1* | 6/2016 | Bai | G06F 30/10<br>345/419 |
| 2020/0384229 | A1* | 12/2020 | Lashinsky | G16H 50/50 |
| 2021/0264684 | A1 | 8/2021 | Mercer et al. | |

FOREIGN PATENT DOCUMENTS

| | | |
|---|---|---|
| CN | 109978655 | 7/2019 |
| CN | 110648393 | 1/2020 |
| CN | 112084398 | 12/2020 |
| CN | 112883811 | 6/2021 |
| CN | 113592592 | 11/2021 |
| CN | 113674053 | 11/2021 |
| CN | 114419703 | 4/2022 |
| JP | 2008501375 | 1/2008 |
| JP | 2013101526 | 5/2013 |
| JP | 2016520384 | 7/2016 |
| WO | 2014150776 | 9/2014 |
| WO | 2015157505 | 10/2015 |
| WO | 2020141754 | 7/2020 |

OTHER PUBLICATIONS

EPO, Extended European Search Report for EP Application No. 22914133.8, Feb. 26, 2025.

JPO, Decision of Refusal for JP Application No. 2024-536987, Jul. 8, 2025.

WIPO, International Search Report for PCT/CN2022/137573, Jan. 28, 2023.

* cited by examiner

| | Size | Applicable size range of b |
| --- | --- | --- |
| F Mask-Type A | L | >80mm |
| | M | 65—80mm |
| | S | <65mm |

VIRTUAL MASK WEARING METHOD AND APPARATUS. TERMINAL DEVICE, AND READABLE STORAGE MEDIUM

CROSS-REFERENCE TO RELATED APPLICATIONS

This application is a U.S. national stage entry under 35 U.S.C. § 371 of International Application No. PCT/CN2022/137573, filed on Dec. 8, 2022, which claims priority to Chinese Patent Application No. 202111678051.6, filed on Dec. 31, 2022, the entire disclosures of which are incorporated herein by reference.

TECHNICAL FIELD

The present application relates to the technical field of medical devices, and in particular to a virtual wearing method and apparatus for a mask, a terminal device, and a readable storage medium.

BACKGROUND

In recent years, noninvasive positive pressure ventilation has been widely used for obstructive sleep apnea (OSA), chronic obstructive emphysema (COPD), etc.

The mask as an interface apparatus on the face of the patient during a noninvasive ventilation treatment, can surround the nose and mouth of the face of the patient and form a sealed breathing space. According to different contact modes, the masks are generally divided into four types: a nasal mask, an oral mask, a full face mask, and a nasal pillows mask, among them, the nasal mask covers only the nose, the oral mask covers only the mouth, the full face mask covers both the mouth and nose, and the nasal pillows mask plugs into the nostrils. Meanwhile, in order to fit different face sizes, the mask is set to different models such as large size, medium size, small size and small wide size.

In order to provide more effective treatment, it is desirable to select a mask that fits the size of the face of the patient. If the mask does not fit the size of the face, it may cause air leakage and other phenomena, which may affect the wearing comfort and reduce the treatment effect.

In the prior art, with regard to the type selection of the masks, it is common to select the type and appearance of the mask by using photographs or videos, etc. in combination with self-aesthetics, and then measure the nose width by using a nasal measuring tape so as to select an appropriate mask model. In practical application, the above-mentioned methods have large deviations and no feeling of experience, and often appear misjudgment, erroneous judgment, and other inappropriate positions such as at nose bridge and chin, thus resulting in frequent returns and exchanges.

SUMMARY

In view of the foregoing, embodiments of the present application have been developed to provide a virtual wearing method and apparatus for a mask, a terminal device, and a readable storage medium that overcome or at least partially solve the foregoing problems.

In a first aspect, the present application provides a virtual wearing method for a mask, and the method includes:

acquiring a facial image of a user;

determining actual facial feature data according to the facial image;

determining and displaying one or more matched first masks of various models according to the actual facial feature data;

determining a target mask from the first masks according to received first input from the user; and generating wearing picture information according to the facial image and the target mask, and displaying the wearing picture information.

In a second aspect, the present application provides a virtual wearing apparatus for a mask, and the apparatus includes:

an image collection module, configured for acquiring a facial image of a user;

an image processing module, configured for determining actual facial feature data according to the facial image;

a display module, configured for displaying one or more matched first masks of various models according to the actual facial feature data;

an operation module, configured for determining a target mask from the first masks according to received first input from the user; and a determination module, configured for generating wearing picture information according to the facial image and the target mask;

wherein the display module, further configured for displaying the wearing picture information.

In a third aspect, the present application provides a terminal device, including a display, a processor, a memory, and a program or an instruction stored on the memory and executable on the processor, wherein the program or the instruction, when executed by the processor, implements the steps of the method described as the first aspect.

In a fourth aspect, the present application provides a readable storage medium, storing a program or an instruction thereon, wherein, the program or the instruction, when executed by a processor, implements the steps of the method described as the first aspect.

DETAILED DESCRIPTION

In order to make the above purposes, features, and advantages of the present application more obvious and understandable, further detailed explanations will be provided below in conjunction with the accompanying drawings and specific implementation methods.

Figure 1:
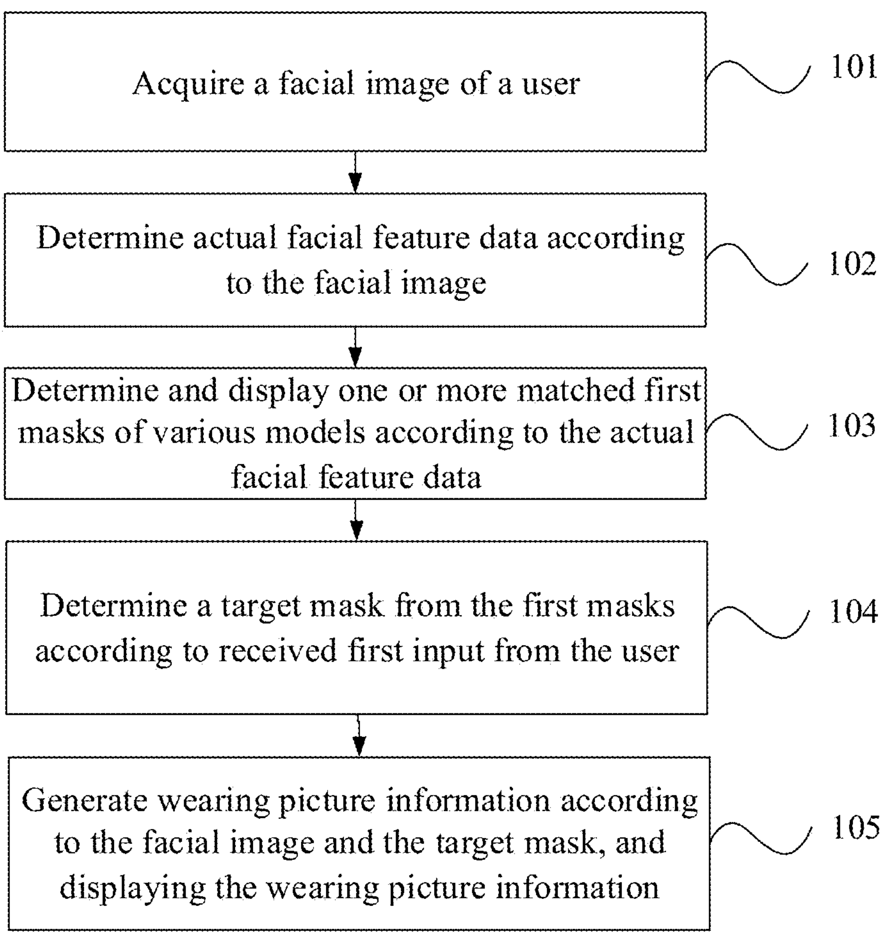
FIG. 1 is a flow chart of a virtual wearing method for a mask according to an embodiment of the present application.

In some embodiments, referring to FIG. 1, a flow chart of a virtual wearing method for a mask is shown, which may specifically include the following step 101 to step 105.

Some embodiments of the present application provide a virtual wearing method for a mask, which is applied to a terminal device, the terminal device has a display device such as a screen apparatus, and the terminal device is a device for allowing a user to select a mask of a specific model, for example, a mask vending terminal device.

Step 101, acquiring a facial image of the user.

In this step, the user is a patient who needs to select a mask; this step is to collect a facial image of a user via an image collection module in real-time when allowed by the user, wherein the facial image can be a two-dimensional image or a three-dimensional image, and the facial image can be a static photograph or a dynamic video. In practical applications, an image collection module automatically collects the facial image of the user in real-time so as to acquire the facial image of the user.

The above-mentioned image collection module may include all known devices capable of collecting two-dimensional image information, such as, but not limited to, a camera, a video camera, an infrared imager, a monitor, etc.; the above-mentioned image collection module may also include all known devices capable of acquiring three-dimensional image information, such as, but not limited to, a 3D scanner, a stereo imager, etc.; and the above-mentioned three-dimensional image may be a dynamic or static 3D image acquired by the above-mentioned devices capable of acquiring three-dimensional image information, a point cloud or a 3D image obtained through 2D data analysis, etc.

Step 102, determining actual facial feature data according to the facial image.

In this step, based on the collected facial image of the user, the facial features of the user are identified so as to obtain the actual facial feature data of the user.

In practical applications, the above-mentioned actual facial feature data includes but is not limited to at least one of facial beard feature information, facial contour feature information and chin type feature information, and also includes position information and size information of the key features; the key features include but are not limited to, eyes, a center position between the eyebrows, a nose, philtrum and lower jaw, size information of the eyes including distance information between the eyes, size information of the nose including nose width information, nose bridge height information, and distance information from nose tip to lower jaw.

Step 103, determining and displaying one or more matched first masks of various models according to the actual facial feature data.

In this step, since the above-mentioned various facial feature data reflect the actual facial condition of the user, the facial features applicable to masks of various models and the size range of the facial features can be preset or determined through large data analysis, according to the facial feature data determined in step 102, the first masks of various models including different types, different sizes and adapted to the face of the user can be determined, and the above-mentioned first masks are displayed through a display module for displaying the wearing effect after being selected by the user.

The model of the mask is composed of mask types, applicable facial features, and applicable sizes. That is to say, each mask model includes information such as the mask types, the applicable facial features and the applicable sizes, wherein the mask types include a nasal mask, a mouth mask, a full-face mask, and a nasal pillows mask, and the applicable facial features include facial beard feature information, facial contour feature information and chin type feature information, etc.; the applicable sizes can be divided into different sizes such as a large size, a medium size, a small size, and a small wide size, etc., and different sizes correspond to different ranges of facial feature data.

Figure 2:
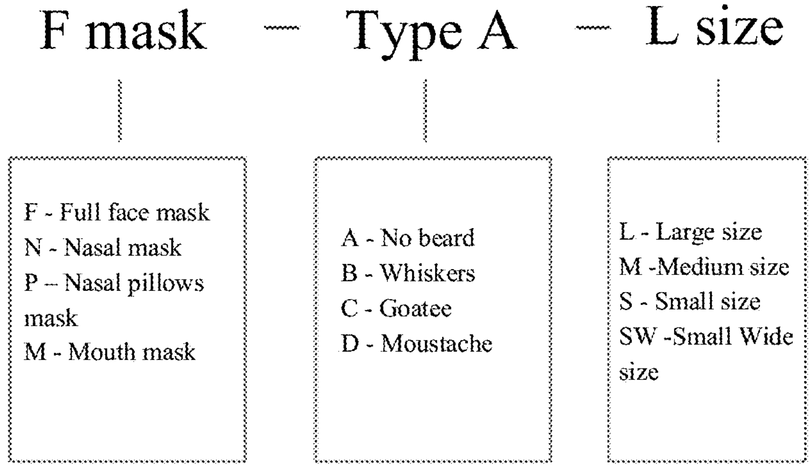
FIG. 2 is a schematic diagram of a reference classification of the mask according to an embodiment of the present application.

In some embodiments, referring to FIG. 2, a schematic diagram for a reference classification of the mask is shown. As shown in FIG. 2, the F-Mask—Type A—L-size mask is a mask model of a full face type, no beard, and a large size.

Figures 3, 4:
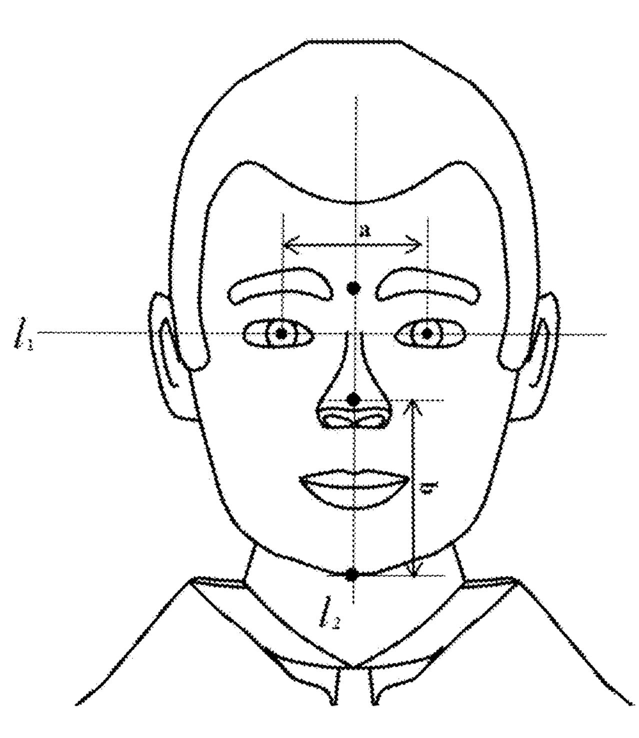
FIG. 3 is a suitable size standard for the "F-Mask—Type A" class according to the distance from the nose tip to the lower jaw in an embodiment of the present application.
FIG. 4 is a schematic diagram of the geometric relationship of the positions of the key features in an embodiment of the present application.

The applicable size is the range of fit dimensions for the key features. For example, for a range of a distance size b from the nose tip to the lower jaw, the range of the distance size b from the nose tip to the lower jaw on the face of the patient for each mask is pre-included in the database. Referring specifically to FIG. 3, a portion of the applicable size standards for classifying "F Mask—Type A" according to the size b in embodiments of the present application is shown. When determining a mask matching the actual facial feature data of a user, when issuing a call instruction to a database, outputting information of the range of application of the size b of a specific mask to the terminal device.

Certainly, it is understood that the patient interface sizing database may simultaneously include a range information of a plurality of sizes for each of the masks in the above classification markers, such as simultaneously including the nose width information, the distance information between the eyes, the nose bridge height information, etc. for each mask. The selection of the final mask device is made more accurate by a common reference of the range information of the plurality of sizes.

Step 104, determining a target mask from the first masks according to received first input from the user.

In this step, the first input is an input of a user selecting a target mask from the first masks and specifically can be operations such as touch control, click, and cursor locking on the target mask.

Step 105, generating wearing picture information according to the facial image and the target mask, and displaying the wearing picture information.

In this step, by adding the target mask to the above-mentioned facial image using a picture composition technique, picture information of the user wearing the target mask can be generated, and then the wearing picture information is displayed, namely, a picture of the user wearing the target mask can be simulated so as to show a wearing effect to the user, facilitating the user to know the wearing effect of the mask in advance in a selection stage, and avoiding selecting a mask which does not comply with the type and appearance of the actual situation of the user due to misjudgment or erroneous judgment.

Some embodiments of the present application include the following advantages:

the method includes: acquiring a facial image of a user; determining various facial feature data according to the facial image; determining and displaying one or more matched first masks of various models according to each facial feature data; determining a target mask from the first masks according to the received first input from the user; generating wearing picture information according to the facial image and the target mask, and displaying the wearing picture information. Since the facial feature data thereof is determined according to the facial image of the user in real-time, and thus the facial feature data reflects the actual facial feature of the user, a plurality of first masks suitable for different types and sizes of the facial features of the user can be accurately matched according to the facial feature data; then, after the user determines the target mask through the first input, according to the target mask and the facial image of the user, the wearing picture information can be generated and displayed through virtual reality (VR) and other technologies, so as to simulate the effect of the user wearing the target mask, enable the user to have a feeling of being personally on the scene, and facilitate the user to select a more satisfactory mask.

In some embodiments of the present application, a user takes photos of his/her face through an image collection module of the terminal device and sees his/her face picture in real-time in a display module. The system prompts the user to move the face to align with the camera and collects size information; the system identifies patient facial features and recommends the appropriate mask type. The user then selects a mask and implements VR wear in the display module. Through the terminal device, the user can intuitively feel the appearance, size, performance, wearing, and using mode of each mask, and can watch the video tutorial and order for purchase, which is convenient and quick.

It can be understood that the method provided in the embodiments of the present application can be implemented by an app, a WeChat plug-in, etc. of a mobile phone application for the convenience of a client, and can also be implemented by a separate device or in combination.

In some embodiments, the methods provided by embodiments of the present application, after the step 102 described above, further include step 106 to step 108.

Step 106, determining a geometric relationship between the positions of the key features according to the actual facial feature data.

In this step, the facial feature data includes location information of the key features including, but not limited to, the eyes, the center position between the eyebrows, the nose, the philtrum, and an upper jaw and a lower jaw, so that the geometric relationship between the positions of the key features can be determined.

Specifically, when the distance between the key features is calculated through the location marks of the key features, the geometric relationship between the key features is further determined.

Step 107, determining whether the face of the user is skewed according to the geometric relationship between the positions of the key features.

Since the position relationship of the key features of the human face is fixed in the natural front face state, namely, the positions of the key features are in fixed geometric relationships, it can be determined whether the current face of the user is skewed according to the actual geometric relationship between the positions of the key features.

For example, for the five points of the left eyeball, the right eyeball, the center position between the eyebrows, the nose tip, and the lower jaw located on the face of the user, as shown in FIG. 4, the connection line between the left eyeball and the right eyeball is defined as $l_1$, the connection line between the center position between the eyebrows, the nose tip and the lower jaw is defined as $l_2$; after receiving the position information of the above-mentioned five points, the distance size a between the two eyes and distance size b from the nose tip to the lower jaw will be automatically calculated, and the geometric positional relationship between the straight line $l_1$, the straight line $l_2$, the size a and the size b will be checked. If and only if it checks that line $l_1$ and the line $l_2$ are perpendicular to each other and the size a is bisected by the line $l_2$, it is determined that the face of the patient at this time is in a front face state with no skew and no rotation, and the size b is output, which provides data for the determination of the second matching score of the subsequent fitting mask. However, when the straight lines $l_1$ and $l_2$ are not perpendicular or the size a cannot be bisected by the line $l_2$, it indicates that the user currently is not facing the image collection module of the terminal device in a front face state, namely, the face of the user face is in a skew state.

Step 108, when it is determined that the face of the user is skewed, generating prompt information to prompt the user to adjust the facial pose.

In this step, when the face of the user is skewed, data collection and mask fitting recommendations are inconvenient, and thus prompt information needs to be issued to guide the patient to rotate the face to a specific position.

In some embodiments, step 103 described above includes step 301 to step 304.

Step 301, acquiring preset corresponding relationships between masks of different models and facial feature data.

In this step, the facial features suitable for masks of various models and the sizes of the facial features are determined in advance through large data analysis, and the range of facial feature data suitable for masks of various models is determined, so as to determine the above-mentioned corresponding relationship.

In some embodiments, the facial feature data includes, but is not limited to, facial beard feature information, facial contour feature information, chin type feature information, and position information and size information of the key features; the key features include, but are not limited to, one or more of the eyes, the center position between the eyebrows, nose, the philtrum, the upper jaw and the lower jaw, and the size information of the eyes includes the distance information between the eyes.

In some embodiments, the facial feature data includes the size information of a nose including the nose width information, the nose bridge height information, and distance information from nose tip to an upper jaw, and the distance information from the nose tip to the lower jaw. Wherein the distance information from the nose tip to the upper jaw is used for selecting a nasal mask or a nasal pillows mask, and the distance from the nose tip to the upper jaw specifically refers to the distance between the nose tip and the highest point of the upper jaw; the distance information from the nose tip to the lower jaw is used for selecting a full face mask, and the nose tip to lower jaw distance specifically refers to the distance between the nose tip and the lowest point of the chin.

In some embodiments, the facial feature data includes the size information of the nose including the nose width information, the nose bridge height information, and the distance information from the nose tip to the upper jaw.

In some embodiments, the facial feature data includes the size information of the nose including the nose width information, the nose bridge height information, and the distance information from the nose tip to the lower jaw.

Wherein the above-mentioned corresponding relationship can be stored in a data system, and the data system is managed and maintained by a service side; the data system can be bound to the above-mentioned terminal device, and is performed together with the downloading and accessing of the above-mentioned terminal device, for example, but not limited to, data information of the data system and a system file of the above-mentioned terminal device together forming an APP applied to the terminal device; it can also be stored in a cloud end, a base station, a hardware storage device such as a hard disk, a USB device, etc. and is available at any time in an application.

Step 302, determining first masks of various models corresponding to the actual facial feature data according to the preset corresponding relationships.

In this step, since the above-mentioned pre-set predetermines a mask model for which each type of facial feature data corresponds to a match, the mask model corresponding to the actual facial feature data can be determined according to the above-mentioned preset corresponding relationship, namely, the above-mentioned first mask can be determined.

In practical applications, the first mask to which the actual facial feature data corresponds may be one or more.

Step 303, displaying each of the first masks.

Each of the first masks determined in step 302 is displayed for selection and determination by the user.

In some embodiments, the preset corresponding relationships include a first sub-corresponding relationship between a mask type and a facial feature, and a second sub-corresponding relationship between a mask size and a size range of the key feature, and step 302 includes step 3021 to step 3023.

Step 3021, determining a first mask type according to the first sub-corresponding relationship and facial features in the actual facial feature data.

In this step, an actual facial feature of the user is extracted from the actual facial feature data, and then an adaptive mask type, namely, the above-mentioned first mask type, is determined based on the actual facial feature in combination with the above-mentioned first sub-corresponding relationship.

Step 3022, determining a first mask size according to the second sub-corresponding relationship and size information of the key features in the actual facial feature data.

In this step, the size information of the key features of the user is extracted from the actual facial feature data, and then an adaptive mask size, namely, the above-mentioned first mask size, is determined based on the size information of the key features in combination with the above-mentioned second sub-corresponding relationship.

Step 3023, determining a first mask according to the first mask type and the first mask size.

In this step, since the first mask type determines a specific type of the mask and the first mask size defines a specific size of the mask, by combining the first mask type and the first mask size, it is possible to determine a mask of a specific model, namely, the above-mentioned first mask matching the actual facial feature data of the user.

In some embodiments, the method provided in embodiments of the present application further includes step 3024 to step 3027 after the above-mentioned step 3023.

Step 3024, determining a first matching score for each of the first masks according to the actual facial feature data and the first sub-corresponding relationship.

In this step, since the first sub-corresponding relationship determines the correspondence relationship between the mask type and the facial feature, a corresponding matching score, namely, the above-mentioned first matching score, can be determined according to the actual facial feature of the user in the actual facial feature data, wherein a higher score indicates that the mask model is determined to be more suitable for the face shape feature of the user from the perspective of the user feature, and conversely, it indicates that the mask model is determined to be less suitable for the face shape feature of the user from the perspective of the user feature.

For example, if it is identified that the face of the user has no beard through the actual facial feature data and the recommended type A mask is output, and the "F mask—type A—M size" mask is output through a data system such as a database, it is determined that the mask is suitable for the facial feature at this time, and a higher feature score, for example 95 points, is given, which is also the above-mentioned first matching score.

Step 3025, determining a second matching score for each of the first masks according to the actual facial feature data and the second sub-corresponding relationship.

In this step, since the second sub-corresponding relationship determines the correspondence relationship between the mask size and the size range of the key feature, a corresponding matching score, namely, the above-mentioned second matching score, can be determined according to the size information of the key feature of the user in the actual facial feature data, wherein a higher score indicates that the mask model is determined to be more suitable for the face shape feature of the user from the perspective of the facial size of the user, and conversely, it indicates that the mask model is determined to be less suitable for the facial size of the user from the perspective of the facial feature of the user.

For example, when the output is b=70 mm through image analysis, i.e., when it is determined that the distance from the nose tip to the lower jaw of the user is 70 mm, and the database output is "F mask—Type A—M size", it can be easily seen from FIG. 3 that b=70 mm is within the applicable b size range of "F mask—Type A—M size", and it is determined that the size score of the "F mask—Type A—M size" mask with respect to the face of the user is higher, i.e., the second matching score is higher, for example, 95 points.

Similarly, if the database output is "F mask—Type A—M size" when the output is b=88 mm by the image analysis, the size score of the "F mask—Type A—M size" mask with respect to the face of the user is determined to be low, e.g. 30 points, since b=88 mm is not within the applicable b size range of "F mask—Type A—M size". In this way, a size score is obtained for a certain mask with respect to the face of a certain user, which in turn can be displayed.

Step 3026, determining a composite matching score for each of the first masks according to the first matching score and the second matching score.

In this step, the first matching score and the second matching score are weighted to obtain a composite score for matching each of the first masks with the face of the patient, namely, the above-mentioned composite matching score. The higher the composite score, the better the matching degree.

Step 3027, displaying a first matching score, a second matching score, and a composite matching score for each of the first masks.

In this step, the above-mentioned matching scores are displayed, so that the user knows the specific matching situation between each of the first masks and his/her face, and is convenient for the user to screen and compare.

In some embodiments, step 105 described above includes step 501 and step 502.

Step 501, performing a location mark on the facial image according to the position information of each of the key features.

In the step, one or more of the position information of the above-mentioned key features, such as the nose tip, the center position between the eyebrows, the philtrum, and the eyes, are marked and located so as to realize real-time location mark on a facial image; the location mark may be marked and located in real-time as the face of the patient moves.

Step 502, positioning VR graphic information of the target mask on the facial image according to the location mark, and generating the wearing picture information.

In this step, since the above-mentioned location mark can mark and position the key feature position of the face of the patient in real-time when the face of the patient moves, VR graphic information of the target mask can be acquired via the database, then VR graphic information of the mask is positioned and matched with the above-mentioned location mark, and wearing picture information is generated, and the wearing picture information is displayed, namely, the VR graphic information of the mask can be positioned on the face of the patient in real-time. It will be appreciated that the VR graphic information of the mask may move as the face of the patient moves, achieving a VR effect of "real-time wearing".

In practical applications, mark location is performed through one or more key feature positions of the face of the user in real-time, and VR graphic information of the mask output by the database is received, and then the VR graphic information of the mask is matched with the location mark so as to position the VR graphic information of the mask on the face of the patient in real-time. In the matching location, there may be a separate matching of each feature or a combined matching of several features, for example, a matching of a distance and angle of inclination between the nose tip to the outermost sides of the upper alveolar, etc.

In a practical application, the above-mentioned wearing picture is displayed through an interface interaction window of a terminal device, and the interface interaction window is configured to be able to output information, display relevant contents and receive an operation instruction input by a user, and to be able to display prompt information when necessary. For example, the acquired information such as a real-time facial image and a real-time location of the user can be displayed in real-time, so that the user can see the facial features thereof in real time; mask VR images can be displayed, and the mask VR images can also be simulated on the face of the patient according to real-time location information. It should be understood that the mask VR image is stationary relative to the face as the face moves, i.e., resembles a real wearing effect.

In some embodiments, the interface interaction window is further configured to display performance information of the selected target mask, such as, but not limited to, weight of the mask, dead space volume of the mask, applicable pressure of the mask, etc.; information on the wearing and usage of the mask may also be displayed, such as, but not limited to, the wearing process of the mask, the usage and cleaning method. etc.; it is also possible to display the fitting degree information of the mask, such as but not limited to, displaying the reason why the score is low that "the mask is too large, and it is recommended to use a smaller mask" and "the mask is too small, and it is recommended to use a larger mask" when the composite score of face matching is low; the user prompt information can also be given when necessary, for example, but not limited to prompt the user to adjust the facial position when calculating the distance size from the nose tip to the lower jaw; it is also possible to display dynamic prompt information, for example, if the mask selected by the user is a nasal mask or a nasal pillows mask, and a mouth opening action is made during usage, a venting dynamic line on the mouth of the user may be displayed, so as to prompt the user that the mouth cannot be opened when using the nasal mask or nasal pillows mask.

In some embodiments, the method provided by embodiments of the present application may further receive a second input from a user, select a different sizing reference, for example, but not limited to the size b of the distance from the nose tip to the lower jaw on the face of the patient, and may interrupt the database to transmit the applicable size information, i.e., the above-mentioned second sub-corresponding relationship, to the terminal device when necessary, in which case the user may choose to determine whether to use the size score as the necessary reference condition for the final composite matching score.

In some embodiments, the method provided by embodiments of the present application may further receive a third input from a user, manage and control a feature score instruction, and may interrupt the determination of the second matching score as needed, in which case the user may choose to determine whether to use the second matching score as a necessary reference condition for the final composite matching score through the second input operation. At the same time, the user can also determine a specifically identified user facial feature category through a third input, for example, identifying a beard feature and a face shape feature separately or simultaneously; the user may also determine the mark location of the key features by a third input operation, e.g., a mark location is performed on certain features in the eyes, the center position between the eyebrows, the philtrum, the upper lip, the lower jaw, and the nose tip.

Figure 5:
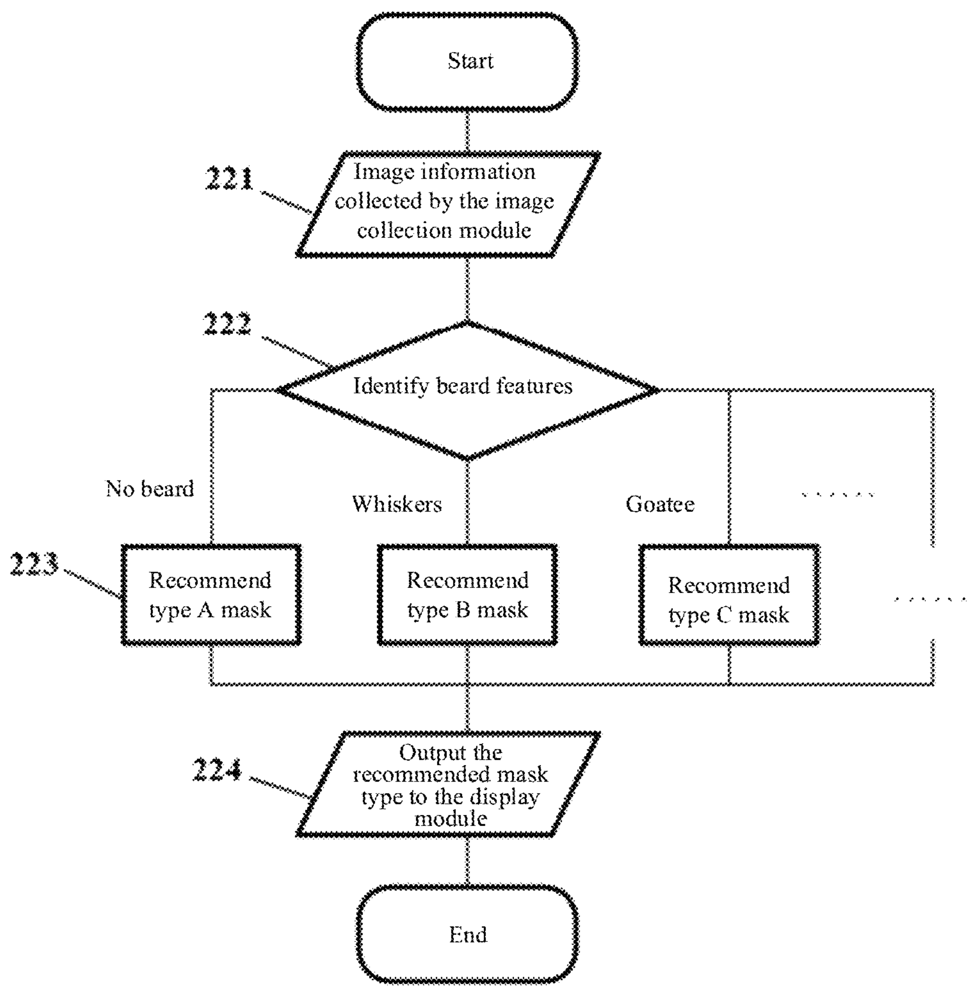
FIG. 5 is a flow chart showing mask recommendation by identifying a beard feature of a face of a user according to an embodiment of the present application.

Referring to FIG. 5, a flow chart showing mask recommendations by identifying a beard feature of a face of a user according to an embodiment of the present application is shown.

As shown in FIG. 5, in step 221, image information collected by an image collection module is received;

in step 222, a selection procedure is performed to identify a beard feature;

in step 223, a mask of a recommended corresponding model is matched according to a specific beard feature, and then proceeding to step 224; for example, if it is identified that the face of the user has no beard, the user is recommended to use a type A mask; if it is identified that the face of the user is whisker, it is recommended to apply type B mask; if it is identified that the face of the user is goatee, it is recommended to apply C-type mask;

in step 224, the recommended results are output to the display module, and the display module receives and displays the recommended results.

Certainly, there are discrimination and recommendation processes similar to those described above when performing the identification of patient facial contour features, patient chin type features, etc., and will not be described in detail herein.

It should be understood that a plurality of features of the face of the patient may be identified simultaneously, such as, but not limited to, whisker features, facial contour features, chin type features, etc., and then combined to give a recommended mask type.

Figure 6:
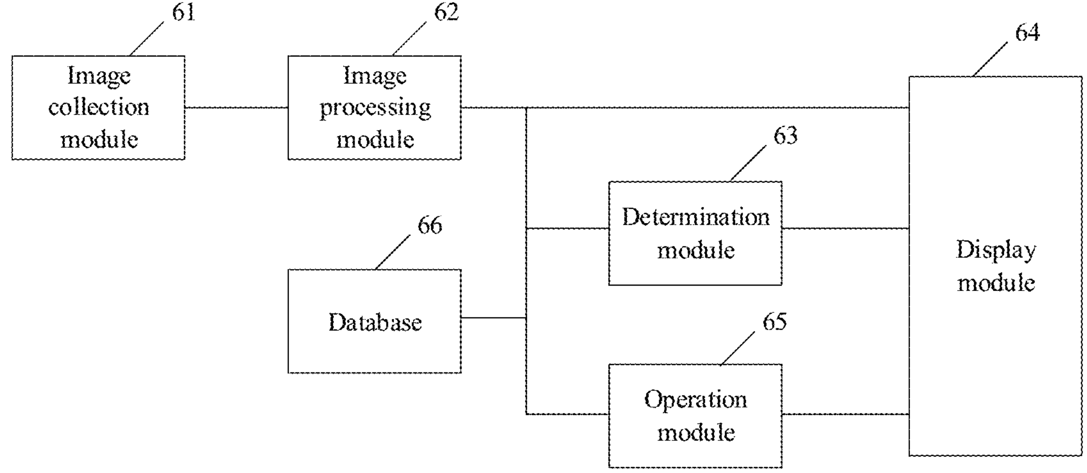
FIG. 6 is a block diagram of a virtual wearing apparatus for a mask according to an embodiment of the present application.

In some embodiments, referring to FIG. 6, a block diagram of a virtual wearing apparatus for a mask is shown, which may specifically include:

- an image collection module 61, used for acquiring a facial image of a user;
- an image processing module 62, used for determining actual facial feature data according to the facial image;

a determination module 63, used for determining one or more matched first masks of various models according to the actual facial feature data;

a display module 64, used for displaying each of the first masks;

an operation module 65, used for determining a target mask from the first masks according to the received first input from the user;

a determination module 63, further used for generating wearing picture information according to the facial image and the target mask;

and a display module 64, further used for displaying wearing picture information.

Some embodiments of the present application include the following advantages:

the virtual wearing apparatus is used for implementing the operations including: acquiring a facial image of a user; determining actual facial feature data according to the facial image; determining and displaying one or more matched first masks of various models according to the actual facial feature data; determining a target mask from the first masks according to the received first input from the user; generating wearing picture information according to the facial image and the target mask, and displaying the wearing picture information. Since the actual facial feature data thereof is determined according to the facial image of the user in real-time, and thus the actual facial feature data reflects the actual facial feature of the user, a plurality of first masks suitable for different types and sizes of the facial features of the user can be accurately matched according to the facial feature data; then, after the user determines the target mask through the first input, according to the target mask and the facial image of the user, the wearing picture information can be generated and displayed through virtual reality (VR) and other technologies, so as to simulate the effect of the user wearing the target mask, enable the user to have a feeling of being personally on the scene, and facilitate the user to select a more satisfactory mask.

In some embodiments, the determination module 63 is specifically used to acquire preset corresponding relationships between masks of different models and facial feature data; determining the first masks of various models corresponding to the actual facial feature data according to a preset corresponding relationship.

In some embodiments, facial feature data, including but not limited to at least one of facial beard feature information, facial contour feature information, chin type feature information, also includes position information and size information of the key features; key features include, but are not limited to, one or more of eyes, the center position between the eyebrows, the nose, the philtrum, the upper jaw and the lower jaw, and size information of the eyes includes the distance information between the eyes;

the size information of a nose includes nose width information, nose bridge height information, and the distance information from the nose tip to the lower jaw; or the size information of the nose includes the nose width information, the nose bridge height information, and the distance information from the nose tip to the upper jaw; or the size information of the nose includes the nose width information, the nose bridge height information, and the distance information from the nose tip to the lower jaw.

In some embodiments, the image processing module 62 includes a size data processing unit including:

a first determination subunit, used for determining a geometric relationship between the positions of the key features according to the actual facial feature data after determining the facial feature data according to the facial image;

a second determination subunit, used for determining whether the face of the user is skewed according to the geometric relationship between the positions of the key features;

a prompt subunit used for, when it is determined that the face of the user is skewed, generating prompt information to prompt the user to adjust the facial pose.

In some embodiments, the image processing module 62 further includes:

an image location unit, used for performing location mark on the facial image according to position information of each of the key features;

the determination module 63 includes:

a VR matching determination unit, used for positioning VR graphic information of the target mask on the facial image according to the location mark, and generating the wearing picture information.

In some embodiments, the preset corresponding relationships in the apparatus include a first sub-corresponding relationship between mask type and facial features and a second sub-corresponding relationship between mask size and size range of key features;

the determination module 63 includes:

a type determination unit, used for determining a first mask type according to the first sub-corresponding relationship and facial features in the actual facial feature data;

a size determination unit, used for determining a first mask size according to the second sub-corresponding relationship and size information of the key features in the actual facial feature data; and a mask determination unit, used for determining the first mask according to the first mask type and the first mask size.

In some embodiments, the determination module 63, further includes:

a feature score determination unit, used for determining a first matching score for each of the first masks according to the actual facial feature data and the first sub-corresponding relationship after the first mask is determined according to the first mask type and the first mask size;

a size score determination unit, used for determining a second matching score for each of the first masks according to the actual facial feature data and the second sub-corresponding relationship;

a composite score determination unit, used for determining a composite matching score for each of the first masks according to the first matching score and the second matching score;

and a display module for displaying the first matching score, the second matching score, and the composite matching score for each of the first masks.

Figure 7:
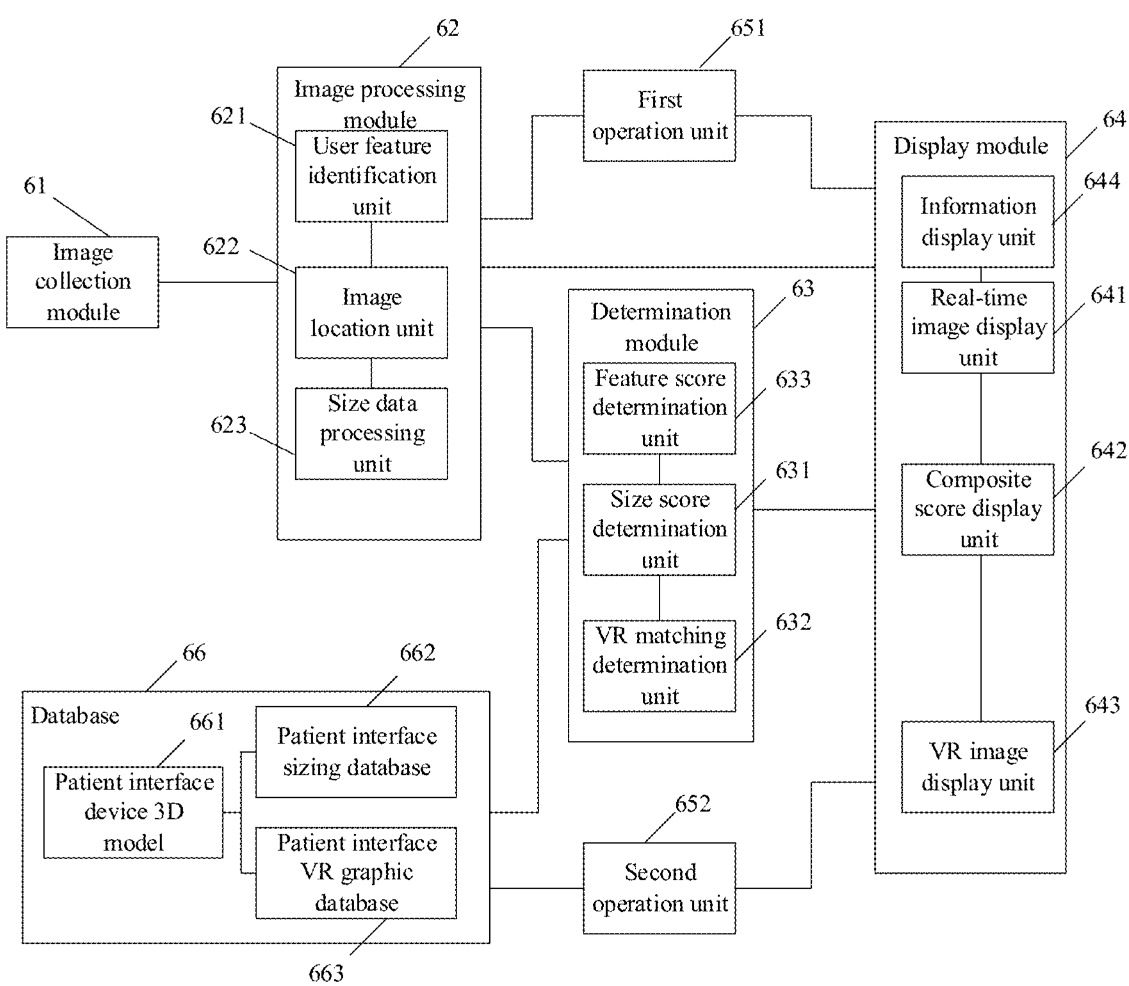
FIG. 7 is a block diagram of another virtual wearing apparatus for a mask according to an embodiment of the present application.

Referring to FIG. 7, it shows a block diagram of another virtual wearing apparatus for a mask provided by an embodiment of the present application.

As shown in FIG. 7, the above-mentioned image processing module 62 functions to receive the image information collected by the image collection module 61, and to identify, locate and process the specific size data. The image processing module 62 further includes a user feature identification unit 621, an image location unit 622, and a size data processing unit 623.

In particular, the user feature identification unit 621 may identify features of the face of the patient, for example, but not limited to, it may identify beard features of the face of the patient (whether a beard is present, beard distribution and density, etc.), identify patient facial contour features (round or melon face, whether have facial defects, etc.), and identify key feature locations (the nose tip, the center position between the eyebrows, the philtrum, the eyes, etc.). The user feature identification unit 621 can recognize the characteristics of the face of the patient and output the mask type adapted to the patient facial features to the display module 64.

The image location unit 622 may receive key feature positions (such as the nose tip, the center position between the eyebrows, the philtrum, the eyes, etc.) identified by the user feature identification unit 621, and marks and locates one or more of the key feature positions. Also, the image location unit 622 is configured to mark and locate in real-time as the face of the user moves. It should be understood that, as the face of the patient moves, the image location unit 622 marks and locates the key feature positions of the face of the patient in real-time and outputs to the display module 64, to provide a basis for location for subsequent VR image display. Further, the image location unit 622 may output the marked key feature positions to the size data processing unit 623.

The above-mentioned size data processing unit 623 is configured to receive position information of one or more key features of the face of the user from the image location unit 622 and calculate distance data between specific marks, and then pass the distance data to the determination module 63.

Database 66 is a data system for mask type selection and is managed and maintained by the service provider, which can be bound to the system data, and is performed along with the downloading and accessing of the virtual wearing apparatus for a mask, for example, but not limited to, the data information of the database 66 and the system file of the selection apparatus together forming a APP applied to the mobile phone end; it can also be stored in a cloud, a base station, a hardware storage device (a hard disk, a USB device), etc. and is available at any time in an application. Further, the database 66 is included of a patient interface device 3D model 661, a patient interface sizing database 662, a patient interface VR graphics database 663, etc. The patient interface device 3D model 661, provides the full 3D model of the selectable mask for the service provider and has been labeled according to the contact mode with human face, applicable facial features, applicable size, etc.

The patient interface sizing database 662 provides second data for the determination of a size score that fits the mask in the determination module 63 by including information on a size range for each mask that fits the face in the classification marker described above and outputting the size range information to the determination module 63. For example, in the present embodiment, the range of distance sizes b from the nose tip to the lower jaw of the face of the patient for each of the masks included in the patient interface sizing database 662, outputs size b applicable range information for the particular mask to the determination module 63 when the operation module issues a call instruction.

A patient interface VR graphical database 663 includes VR graphical data for each mask labeled according to the classification described above and may output the VR graphical data to the determination module 63 for matching determination of the VR data in the determination module 63.

The determination module 63 selects a logical execution unit of the system for the VR patient interface device. It functions to receive data information from the image processing module 62 and the database 66, make size score determinations and VR match determinations, and further output the results to a display module 64. Specifically, the determination module 63 includes a size score determination unit 631, a VR matching determination unit 632, and a feature score determination unit 633. In the present embodiment, the size score determination unit 631 simultaneously receives the first data output by the image processing module 62 (for example, outputting the size b of the distance from the nose tip to the lower jaw in the present embodiment) and the second data output by the database 66 (for example, the range information of each mask applicable to the size b output in the present embodiment), and compares the first data and the second data to determine the size score of the mask. Thus, a size score of a certain mask with respect to the face of a certain patient is obtained in the size score determination unit 631, and the size score is output to the display module 64, and the above size score is displayed on the display module 64.

The VR matching determination unit 632 functions to receive the VR graphic information output by the database 66 and the image location information output by the image processing module 62 at the same time, and to locate the above-mentioned VR graphic information on the face of the patient in the image in real-time. Specifically, the VR matching determination unit 632 receives a real-time marking location (such as, but not limited to, the eyes, the nose tip, the philtrum, etc.) output by the image location unit 622 regarding the position of one or more key features on the face of the patient, and receives VR graphic information of the mask output by the patient interface VR graphical database, and then matches the VR graphic information of the mask with the mark location to locate the VR graphic information of the mask on the face of the patient in real-time. The result is output to the display module 64 in real-time, and the above-mentioned wearing effect is displayed in real-time in the display module 64; where the feature matching is performed, it may be a separate matching of each feature or a combined matching of several features, for example, a matching of the distance the angle of inclination between the nose tip and the outermost side of the upper alveolar, etc.

A feature score determination unit 633, which functions to perform matching according to the user feature information output by the image processing module 62 and the mask model information output by the database 66, and to provide a corresponding feature score, wherein a higher score indicates that the mask model is determined to be more suitable for the face shape feature of the user from the perspective of the user feature, and conversely, it indicates that the mask model is determined to be less suitable for the face shape feature of the user from the perspective of the user feature. Specifically, the feature score determination unit 633 simultaneously receives mask type recommendation information output by the user feature identification unit 621 and mask model information output by the patient interface sizing database 662 for matching. For example, if the user feature identification unit 621 identifies no beard on the face of the user and outputs a recommended type A mask, and the patient interface sizing database 662 outputs a type "F mask—type A—M size" mask, then the feature score determination unit 633 will determine that this type of mask fits the facial feature and give a higher feature score (e.g., 95 points). Conversely, a lower feature score is given. Further, the feature score determination unit 633 may output the feature score to the display module 64, and display the feature score in the display module 64.

The operation module 65 is a link connecting the image processing module 62, the database 66, and the display module 64. The user can issue operation instructions to other modules through the operation module 65. Further, the operation module 65 includes a first operation unit 651, and a second operation unit 652. The first operation unit 651 may simultaneously send operation instructions to the image processing module 62 and the display module 64, and manage transmission commands sent or received by the image processing module 62 and the display module 64. Further, for example, the first operation unit 651 may manage the feature score instruction communicated from the user feature identification unit 621 to the feature score determination unit 633 and may interrupt the transmission, when necessary, in which case the user may optionally decide whether to use the feature score as a necessary reference condition for the final composite score through the first operation unit 651. At the same time, the user can also determine the category of the patient facial features identified by the user feature identification unit 621 via the first operation unit 651, for example, identifying beard features and face shape features separately or simultaneously; the user can also determine the mark location of the image location unit 622 by the first operation unit 651, for example, mark location of some features of the eyes, the center position between the eyebrows, the philtrum, the upper lip, the lower jaw, the nose tip. Further, the first operation unit 651 may further include a touch screen operation button presented in the display module 64 and an operation interface having a similar function.

Similarly, the second operation unit 652 may simultaneously send operation instructions to the database 66 and the display module 64, and manage transmission commands sent or received by the database 66 and the display module 64. Further, the user can select different models of patient interface devices via the second operation unit 652, thereby invoking different models of mask VR graphics; a different sizing reference (such as, but not limited to, on the face of the patient, distance size b from the nose tip to the lower jaw) may also be selected by the second operation unit 652 and the transmission from the patient interface sizing database 662 to the determination module 63 may be interrupted when necessary, in this case, the user can optionally decide whether to use the size score as a necessary reference condition for the final composite score through the second operation unit 652. Further, the second operation unit 652 may further include a touch screen operation button presented in the display module 64 and an operation interface having a similar function.

The above-mentioned display module 64 is an interface interaction window of the apparatus and is configured to accept the output information of the image processing module 62 and the determination module 63, and the operation instruction of the operation module 65 and display relevant contents, and to display prompt information when necessary. Further, the display module 64 includes a real-time image display unit 641, a composite score display unit 642, a VR image display unit 643, and an information display unit 644. The real-time image display unit 641 may receive information such as a real-time image and a real-time location output by the image processing module 62 and perform real-time display. That is, the user can see his/her facial features in real-time in the real-time image display unit 641. The VR image display unit 643 may display the mask VR image and "wear" the mask VR image on the face of the patient according to the real-time location information. It should be understood that the mask VR image is stationary relative to the face as the face moves, i.e., resembles a real wearing effect. The composite score display unit 642 may receive the size score output by the size score determination unit 631 and/or the feature score output by the feature score determination unit 633, and perform a weighting operation to obtain and display a composite score for matching the selected mask with the face of the patient. A higher composite score indicates a better degree of matching.

An information display unit 644 configured to display performance information of the selected mask (for example, but not limited to, information of the weight of the mask, dead space volume of the mask, applicable pressure of the mask, etc.), to display wearing and using information of the mask (for example, but not limited to, wearing process of the mask, and using and washing method of the mask, etc.), and to display fitting degree information of the mask (for example, but not limited to, displaying the reason why the score is low when the composite score of face matching is low; "the mask is too large, and it is recommended to use a smaller mask" "the mask is too small, and it is recommended to use a larger mask"); and user prompt information may be given when necessary (for example, but not limited to prompt information that prompts the user to adjust the face position when calculating the distance size b from the nose tip to the lower jaw).

With respect to the apparatus embodiment, which is substantially similar to the method embodiment, the description is relatively simple with reference to the partial description of the method embodiment.

In some embodiments of the present application, it also provides a terminal device including a display, a processor, a memory, and a computer program stored on the memory and executable on the processor, the computer program when executed by the processor implements the steps in a virtual wearing method for a mask and achieves the same technical effect, and in order to avoid repetition, the description thereof will not be repeated.

In some embodiments of the present application, it also provides a readable storage medium storing a computer program which, when executed by a processor, implements various processes such as the steps in a virtual wearing method for a mask and can achieve the same technical effect, and in order to avoid repetition, the description thereof will not be repeated.

The various embodiments in this specification are described in a progressive manner, and each embodiment focuses on the differences from other embodiments. The same and similar parts between each embodiment can be referred to each other.

Persons skilled in the art should understand that embodiments of the present application may be provided as methods, devices, or computer program products. Therefore, the embodiments of the present application may take the form of complete hardware embodiments, complete software embodiments, or embodiments combining software and hardware aspects. Moreover, the embodiment of the present application may take the form of a computer program product implemented on one or more computer available storage medium (including but not limited to disk storage, CD-ROM, optical storage, etc.) containing computer available program code.

In a typical configuration, computer devices include one or more processors (CPUs), input/output interfaces, network interfaces, and a memory. The memory may include non-permanent memory, random access memory (RAM), and/or non-transitory memory in computer-readable medium, such as a read-only memory (ROM) or a flash memory. The memory is an example of a computer-readable medium. The computer readable medium, including permanent and non-permanent, movable and non-movable medium, can be used for information storage by any method or technology. Information can be computer-readable instructions, data structures, program modules, or other data. Examples of storage medium for computers include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, read-only optical disc read-only memory (CD-ROM), digital multifunctional optical disc (DVD) or other optical storage, magnetic cassette tapes, magnetic tape magnetic disk storage or other magnetic storage devices, or any other non-transmission medium that can be used to store information that can be accessed by computing devices. According to the definition in this article, computer-readable medium does not include non-persistent computer-readable medium, such as modulated data signals and carriers.

The embodiment of the present application is described with reference to the flow chart and/or block diagram of the method, terminal device (system), and computer program product according to the embodiment of the present application. It should be understood that each process and/or block in the flow chart and/or block diagram can be implemented by computer program instructions, as well as the combination of processes and/or blocks in the flow chart and/or block diagram. These computer program instructions can be provided to processors of general-purpose computers, specialized computers, embedded processors, or other programmable data processing terminal devices to generate a machine that generates instructions executed by processors of computers or other programmable data processing terminal devices to implement the functions specified in one or more processes and/or blocks in a flow chart.

These computer program instructions can also be stored in the computer-readable memory that can guide computers or other programmable data processing terminal devices to work in a specific way, so that the instructions stored in the computer-readable memory generate a manufacturing product including an instruction device that implements the functions specified in one or more processes and/or blocks of a flow chart.

These computer program instructions can also be loaded onto a computer or other programmable data processing terminal device, enabling a series of operational steps to be performed on the computer or other programmable terminal device to generate computer-implemented processing. The instructions executed on the computer or other programmable terminal device provide steps for implementing the functions specified in one or more processes and/or blocks in a flow chart.

Although preferred embodiments of the present application have been described, those skilled in the art may make additional changes and modifications to these embodiments once they have knowledge of the basic creative concepts. Therefore, the attached claims are intended to be interpreted as including preferred embodiments and all changes and modifications falling within the scope of the embodiments of the present application.

Finally, it should be noted that in this specification, relational terms such as first and second are only used to distinguish one entity or operation from another entity or operation, and do not necessarily require or imply any actual relationship or order between these entities or operations. Moreover, the terms "including", "comprising", or any other variation thereof are intended to encompass non-exclusive inclusion, such that a process, method, item, or terminal device that includes a series of elements not only includes those elements, but also includes other elements that are not explicitly listed, or also includes elements inherent to such process, method, item, or terminal device. Without further limitations, the elements limited by the statement "including one . . . " do not exclude the existence of other identical elements in the process, method, item, or terminal device that includes the elements.

The above provides a detailed introduction to a virtual wearing method for a mask and a virtual wearing apparatus for a mask provided in the present application. This specification applies specific examples to explain the principles and implementation methods of the present application. The above examples are only used to help assistants understand the methods and core ideas of the present application. Meanwhile, for those skilled in the art, there may be changes in specific implementation methods and application scope based on the ideas of the present application. Therefore, the content of this specification should not be understood as a limitation on the present application.

The invention claimed is:

1. A virtual wearing method for a mask, wherein the method comprises:

acquiring a facial image of a user;

determining actual facial feature data according to the facial image;

determining and displaying one or more matched first masks of various models according to the actual facial feature data;

determining a target mask from the one or more matched first masks according to received first input from the user; and generating wearing picture information according to the facial image and the target mask, and displaying the wearing picture information;

wherein determining and displaying the one or more matched first masks of various models according to the actual facial feature data comprises:

determining a first mask type according to facial features in the actual facial feature data.

2. The method according to claim 1, wherein after determining the actual facial feature data according to the facial image, the method further comprises:

determining a geometric relationship between positions of key features according to the actual facial feature data;

determining whether a face of the user is skewed according to the geometric relationship between the positions of the key features; and when it is determined that the face of the user is skewed, generating prompt information to prompt the user to adjust facial pose.

3. The method according to claim 2, wherein determining and displaying the one or more matched first masks of various models according to the actual facial feature data comprises:

acquiring preset corresponding relationships between masks of different models and facial feature data;

determining the one or more matched first masks of various models corresponding to the actual facial feature data according to the preset corresponding relationships; and displaying the one or more matched first masks.

4. The method according to claim 3, wherein the preset corresponding relationships comprise a first sub-corresponding relationship between mask types and the facial features and a second sub-corresponding relationship between mask sizes and size ranges of the key features;

wherein determining the one or more matched first masks of various models corresponding to the actual facial feature data according to the preset corresponding relationships comprises:

determining the first mask type according to the first sub-corresponding relationship and the facial features in the actual facial feature data;

determining a first mask size according to the second sub-corresponding relationship and size information of the key features in the actual facial feature data; and determining the one or more matched first masks according to the first mask type and the first mask size.

5. The method according to claim 4, wherein after determining the one or more matched first masks according to the first mask type and the first mask size, the method further comprises:

determining a first matching score for each of the one or more matched first masks according to the actual facial feature data and the first sub-corresponding relationship;

determining a second matching score for each of the one or more matched first masks according to the actual facial feature data and the second sub-corresponding relationship;

determining a composite matching score for each of the one or more matched first masks according to the first matching score and the second matching score; and displaying the first matching score, the second matching score, and the composite matching score for each of the one or more matched first masks.

6. The method according to claim 3, wherein:

the facial feature data comprises size information of a nose, the size information of the nose comprises nose width information, nose bridge height information, and distance information from nose tip to an upper jaw and distance information from the nose tip to a lower jaw; or the facial feature data comprises the size information of the nose, the size information of the nose comprises the nose width information, the nose bridge height information, and the distance information from the nose tip to the upper jaw; or the facial feature data comprises the size information of the nose, the size information of the nose comprises the nose width information, the nose bridge height information, and the distance information from the nose tip to the lower jaw.

7. The method according to claim 6, wherein the facial feature data comprises at least one of facial beard feature information, facial contour feature information, and chin type feature information, and further comprises position information and size information of the key features; the key features comprise one or more of eyes, a center position between eyebrows, a nose, a philtrum, an upper jaw and a lower jaw, and the size information of the eyes comprises distance information between the eyes.

8. The method according to claim 6, wherein generating the wearing picture information according to the facial image and the target mask comprises:

performing location mark on the facial image according to position information of each of the key features; and positioning virtual reality (VR) graphic information of the target mask on the facial image according to the location mark, and generating the wearing picture information.

9. The method according to claim 1, wherein determining and displaying the one or more matched first masks of various models according to the actual facial feature data further comprises:

determining a first mask size according to size information of key features in the actual facial feature data; and determining the one or more matched first masks according to the first mask type and the first mask size.

10. A terminal device, comprising a display, a processor, a memory, and a program or an instruction stored on the memory and executable on the processor, wherein the program or the instruction, when executed by the processor, implements operations comprising:

acquiring a facial image of a user;

determining actual facial feature data according to the facial image;

determining and displaying one or more matched first masks of various models according to the actual facial feature data;

determining a target mask from the one or more matched first masks according to received first input from the user; and generating wearing picture information according to the facial image and the target mask, and displaying the wearing picture information;

wherein the operation of determining and displaying the one or more matched first masks of various models according to the actual facial feature data comprises:

determining a first mask type according to facial features in the actual facial feature data.

11. The terminal device according to claim 10, wherein after the operation of determining the actual facial feature data according to the facial image, the operations further comprise:

determining a geometric relationship between positions of key features according to the actual facial feature data;

determining whether a face of the user is skewed according to the geometric relationship between the positions of the key features; and when it is determined that the face of the user is skewed, generating prompt information to prompt the user to adjust facial pose.

12. The terminal device according to claim 11, wherein the operation of determining and displaying the one or more matched first masks of various models according to the actual facial feature data comprises:

acquiring preset corresponding relationships between masks of different models and facial feature data;

determining the one or more matched first masks of various models corresponding to the actual facial feature data according to the preset corresponding relationships; and displaying the one or more matched first masks.

13. The terminal device according to claim 12, wherein the preset corresponding relationships comprise a first sub-corresponding relationship between mask types and the facial features and a second sub-corresponding relationship between mask sizes and size ranges of the key features;

wherein the operation of determining the one or more matched first masks of various models corresponding to the actual facial feature data according to the preset corresponding relationships comprises:

determining the first mask type according to the first sub-corresponding relationship and the facial features in the actual facial feature data;

determining a first mask size according to the second sub-corresponding relationship and size information of the key features in the actual facial feature data; and determining the one or more matched first masks according to the first mask type and the first mask size.

14. The terminal device according to claim 13, wherein after the operation of determining the one or more matched first masks according to the first mask type and the first mask size, the operations further comprise:

determining a first matching score for each of the one or more matched first masks according to the actual facial feature data and the first sub-corresponding relationship;

determining a second matching score for each of the one or more matched first masks according to the actual facial feature data and the second sub-corresponding relationship;

determining a composite matching score for each of the one or more matched first masks according to the first matching score and the second matching score; and displaying the first matching score, the second matching score, and the composite matching score for each of the one or more matched first masks.

15. The terminal device according to claim 12, wherein:

the facial feature data comprises size information of a nose, the size information of the nose comprises nose width information, nose bridge height information, and distance information from nose tip to an upper jaw and distance information from the nose tip to a lower jaw; or the facial feature data comprises the size information of the nose, the size information of the nose comprises the nose width information, the nose bridge height information, and the distance information from the nose tip to the upper jaw; or the facial feature data comprises the size information of the nose, the size information of the nose comprises the nose width information, the nose bridge height information, and the distance information from the nose tip to the lower jaw.

16. The terminal device according to claim 15, wherein the facial feature data comprises at least one of facial beard feature information, facial contour feature information, and chin type feature information, and further comprises position information and size information of the key features; the key features comprise one or more of eyes, a center position between eyebrows, a nose, a philtrum, an upper jaw and a lower jaw, and the size information of the eyes comprises distance information between the eyes.

17. The terminal device according to claim 15, wherein the operation of generating the wearing picture information according to the facial image and the target mask comprises:

performing location mark on the facial image according to position information of each of the key features; and positioning virtual reality (VR) graphic information of the target mask on the facial image according to the location mark, and generating the wearing picture information.

18. The terminal device according to claim 10, wherein the operation of determining and displaying the one or more matched first masks of various models according to the actual facial feature data further comprises:

determining a first mask size according to size information of key features in the actual facial feature data; and determining the one or more matched first masks according to the first mask type and the first mask size.

19. A non-transitory computer-readable storage medium, storing a program or an instruction thereon, wherein, the program or the instruction, when executed by a processor, implements operations comprising:

acquiring a facial image of a user;

determining actual facial feature data according to the facial image;

determining and displaying one or more matched first masks of various models according to the actual facial feature data;

determining a target mask from the one or more matched first masks according to received first input from the user; and generating wearing picture information according to the facial image and the target mask, and displaying the wearing picture information;

wherein the operation of determining and displaying the one or more matched first masks of various models according to the actual facial feature data comprises:

determining a first mask type according to facial features in the actual facial feature data.

20. The non-transitory computer-readable storage medium according to claim 19, wherein after the operation of determining the actual facial feature data according to the facial image, the operations further comprise:

determining a geometric relationship between positions of key features according to the actual facial feature data;

determining whether a face of the user is skewed according to the geometric relationship between the positions of the key features; and when it is determined that the face of the user is skewed, generating prompt information to prompt the user to adjust facial pose.

* * * * *